United States Patent
Blum et al.

(10) Patent No.: US 10,341,462 B2
(45) Date of Patent: *Jul. 2, 2019

(54) BUILDING A MULTI-TENANT PORTAL APPLICATION

(71) Applicant: International Business Machines Corporation, Armonk, NY (US)

(72) Inventors: Daniel Blum, Stuttgart (DE); Timo Kussmaul, Boeblingen (DE); Stefan Schmitt, Holzgerlingen (DE); Andreas Stay, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 718 days.

This patent is subject to a terminal disclaimer.

(21) Appl. No.: 15/063,576

(22) Filed: Mar. 8, 2016

(65) Prior Publication Data
US 2016/0261520 A1    Sep. 8, 2016

Related U.S. Application Data

(63) Continuation of application No. 14/636,587, filed on Mar. 3, 2015, now Pat. No. 9,680,962.

(51) Int. Cl.
*G06F 9/50* (2006.01)
*H04L 29/08* (2006.01)
(Continued)

(52) U.S. Cl.
CPC ......... *H04L 67/32* (2013.01); *G06F 9/5027* (2013.01); *G06F 16/958* (2019.01); *H04L 47/70* (2013.01);
(Continued)

(58) Field of Classification Search
None
See application file for complete search history.

(56) References Cited

U.S. PATENT DOCUMENTS

2002/0196273 A1* 12/2002 Krause .............. G06F 17/30899
                                                      715/738
2010/0049637 A1   2/2010 Laventman et al.
(Continued)

OTHER PUBLICATIONS

Gohad et al., "Model driven provisioning in multi-tenant clouds", Service Research and Innovation Institute Global Conference, 2012, © IEEE, pp. 11-20.
(Continued)

*Primary Examiner* — Azizul Choudhury
(74) *Attorney, Agent, or Firm* — Stephen R. Yoder

(57) ABSTRACT

Providing software-as-a-service to a plurality of clients includes: selecting a first virtual portal, determining a score for a first resource to generate a first scored resource, determining a set of scored resources, visually rendering the first virtual portal and the set of portal resources, visually rendering the set of scored resources, and selecting a scored resource from the set of scored resources to be associated with the first virtual portal by updating the resource association matrix with an identifier of the scored resource. The score is selected to represent a usefulness factor of the first resource. Each scored resource of the set of scored resources is selected to be different than each portal resource of a set of portal resources associated with the first virtual portal by a resource association matrix.

8 Claims, 8 Drawing Sheets

(51) Int. Cl.
*G06F 16/958* (2019.01)
*H04L 12/911* (2013.01)
(52) U.S. Cl.
CPC ............ *H04L 47/783* (2013.01); *H04L 67/10* (2013.01); *H04L 67/16* (2013.01); *H04L 67/2838* (2013.01)

(56) References Cited

U.S. PATENT DOCUMENTS

| | | |
|---|---|---|
| 2010/0198730 A1 | 8/2010 | Ahmed et al. |
| 2010/0211548 A1 | 8/2010 | Ott et al. |
| 2011/0078708 A1 | 3/2011 | Dokovski et al. |
| 2011/0173225 A1 | 7/2011 | Stahl et al. |
| 2012/0198073 A1 | 8/2012 | Srikanth et al. |
| 2013/0124229 A1* | 5/2013 | Cashman .............. G06Q 40/08 705/4 |
| 2013/0263209 A1 | 10/2013 | Panuganty |
| 2015/0039765 A1 | 2/2015 | Bragstad et al. |

OTHER PUBLICATIONS

International Search Report and Written Opinion, International Application EP16158171.5, International Filing date Jul. 14, 2016, 10 pages.

Viell et al., "The NIST Definition of Cloud Computing", National Institute of Standards and Technology, U.S. Department of Commerce, Special Publication 800-145, Sep. 2011, pp. i-3, <http://csrc.nist.gov/publications/nistpubs/800-145/SP800-145.pdf>.

Mietzner et al., "A Self-Service Portal for Service-Based Applications", 2010 IEEE International Conference on Service-Oriented Computing and Applications (SOCA), Dec. 13-15, 2010, pp. 1-8, DOI: 10.1109/SOCA.2010.5707165, Perth, WA.

Pathirage et al., "A Multi-tenant Architecture for Business Process Executions", 2011 IEEE International Conference on Web Services, pp. 121-128, DOI: 10.1109.ICWS.2011.99, © 2011 IEEE.

U.S. Appl. No. 14/636,587 entitled "Building a Multi-Tenant Portal Application" filed Mar. 3, 2015.

Appendix P "List of IBM Patents or Patent Applications Treated as Related"; dated Mar. 9, 2015; pp. 2.

* cited by examiner

| | VP 1 | VP2 | VP3 |
|---|---|---|---|
| page 1 | 1 | 0 | 1 |
| page 2 | 0 | 1 | 0 |
| page 3 | 0 | 0 | 1 |
| portlet 1 | 1 | 0 | 1 |
| portlet 2 | 0 | 1 | 1 |

| | VP 1 | VP2 | VP3 |
|---|---|---|---|
| page 1 | 1 | 0 | 1 |
| page 2 | 0 | 1 | 0 |
| page 3 | 0 | 0 | 1 |
| portlet 1 | Page 1 | 0 | Page 1 |
| portlet 2 | 0 | Page 2 | Page 3 |

BUILDING A MULTI-TENANT PORTAL APPLICATION

BACKGROUND

The invention relates generally to a method for providing software-as-a-service to a plurality of clients. The invention relates further to a portal scoring unit for providing software-as-a-service to a plurality of clients, a related portal server, a computing system, a data processing program, and a computer program product.

User interfaces of modern software applications often involve the use of a portal. Portals provide end-users with a unified access to content, applications, and collaboration services in a highly personalized manner. Portals typically provide a middleware framework and tools for building and managing portals using component applications like, e.g., portlets (self-contained applications or content) or other content resources. A portal receives requests issued by clients, e.g., via a browser, and returns responses comprising markup information and/or data, e.g., in XML format, to the client. Portals may also support multiple pages with menu-based or custom navigation for accessing individualized content and portlets for each page.

Typically, a portal employs an architecture, wherein the portal itself may only implement standard functionality like authentication, state handling, aggregation, access control, and so on, and may provide the infrastructure for application components. This architecture includes APIs (application programming interface) for the integration of applications, so that applications from different sources may be used as long as they match the portal product's API. In the portal environment, these applications are typically called portlets.

Normally in prior art, both, the portal and the portlets are implemented as web applications and are deployed to an application server with the functionality to execute web applications. For example, a conventional portal may be implemented as a web application that contains a servlet that constitutes the main Portal entry point. This servlet accepts the client requests and dispatches to further resources like, e.g., other servlets, portlets or JSPs (Java Server Pages) while processing the request. Typically, a portal resource is created and updated or deleted by one or multiple portal administrators.

Today's implementations of portals often involve also virtual portals, which represent virtual entities, each representing the logic of behavior of the distinct portal but implemented by one single portal server.

A conventional virtual portal has its own unique set of resources such as pages, users, themes, skins, and/or portlet instances. Virtual portals may also have their own directory and thus, may have their own set of authorized users and administrators. Typically, virtual portal administrators manage each virtual portal individually.

Conventional portals provide a strict separation between a virtual portal and a resource such as portal pages and portlet instances. In this context, the term "scoping" denotes making portal resources and portal availability uniquely, and separately, to individual virtual portals and their users.

To realize scoping, a conventional portal maintains an association between a virtual portal and a resource. Each scoped resource may be associated with exactly one virtual portal while a virtual portal may be associated with multiple scoped resources. The association may be represented in the form of a relation, a data structure, or by assigning each resource a unique identifier and including a designation of the associated virtual portal in this identifier. Conventionally, there is no available functionality to share resources between multiple virtual portals.

Each portal request may be targeted at one specific virtual portal. While processing the request, a conventional portal may retrieve and use those scoped resources that are associated with the virtual portal targeted by the current request. The conventional portal components provide only a view on scoped resources filtered for the current virtual portal.

If a portal administrator wants to make resources available for use in multiple different virtual portals, copies of the resources need to be created and deployed, one copy for each of the virtual portals. This not only creates significant data redundancy and increases the memory consumption of the portals, worsening performance, but it also complicates the administration of the portal.

Basically, to create a resource in a virtual portal, a portal administrator may perform the following steps: (i) select the virtual portal, for example, the administrator may implicitly select the virtual portal by using a portal URL (universal resource locator) that designates the virtual portal; and (ii) create the resource by using the conventional portal administration functionality. A portal creates the resource in the currently selected virtual portal, i.e., it creates the resource identifier to contain the identifier of the selected virtual portal. The data that represents the resource is stored in the portal database.

Multi tenancy in a portal-as-a-service infrastructure may be provided for by creating a virtual portal for each tenant. That is, the portal administrator may create one virtual portal specifically for one tenant and may configure the virtual portal according to the tenant's requirements. This may include creating the required portal resources in this virtual portal. The administrator may also define a user directory for the virtual portal, which includes the users that are associated with this specific tenant. Users that are not included or authorized in this user directory are not allowed to use this virtual portal.

Several publications address web applications such as portals in a cloud or multi-tenant environment. Patent document US 2013/0263209 discloses an apparatus and methods for managing applications in multi-cloud environments. "The system comprises a service console configured to store management policies. Each management policy corresponds to a respective application deployment on one or more clouds and indicates one or more potential runtime conditions and one or more corresponding management actions."

Patent document US 2010/0049637 discloses mapping portal applications in multi-tenant environment. "A method implemented in a computer infrastructure to associate each of a plurality of tenants with a respective virtual portal and individually meter virtual portal usage at each respective virtual portal."

Using conventional technologies, portal resources, such as pages, portlet instances, themes, and skins, are associated with precisely one virtual portal. In a multi-tenant portal-as-a-service infrastructure, portal resources are often required for all tenants or at least some of the tenants. Because resources cannot be shared between virtual portals, the portal administrator has to create resources separately for each tenant's virtual portal. This may create a significant redundancy in the portal data. Copying resources is a manual process that tends to be error prone and increases administration costs.

Because resources are duplicated, or even multiplied, in the portal model and portal database, the costs of memory consumption and garbage collection increase significantly.

As a consequence, portal performance deteriorates and operating expenses (e.g., for additional hardware) for the portal service provider may rise.

Embodiments of the present invention recognize that there is a need to address the above-mentioned disadvantages of existing virtual portal implementations and, in particular to provide a mechanism to reduce memory consumption and administration requirements in virtual portal environments.

SUMMARY

The need(s) identified above, and others, are addressed by a method for providing software-as-a-service to a plurality of clients, a portal scoring unit for providing software-as-a-service to a plurality of clients, a portal server, a computing system, a data processing program, and a computer program product, according to the independent claims.

In one aspect of the present invention, a method, a computer program product, and a system for providing software-as-a-service to a plurality of clients includes: (i) selecting a first virtual portal, (ii) determining a score for a first resource to generate a first scored resource, (iii) determining a set of scored resources, (iv) visually rendering the first virtual portal and the set of portal resources, (vii) visually rendering the set of scored resources, and (viii) selecting a scored resource from the set of scored resources to be associated with the first virtual portal by updating the resource association matrix with an identifier of the scored resource. The first resource is accessible via the first virtual portal from a portal server. The set of portal resources are associated with the first virtual portal by the resource association matrix. The score is selected to represent a usefulness factor of the first resource. Each scored resource of the set of scored resources is selected to be different than each portal resource of a set of portal resources associated with the first virtual portal by a resource association matrix.

According to one aspect of the present invention, a method for providing software-as-a-service to a plurality of clients may be provided. A portal resource may be accessible via a virtual portal from a portal server, wherein portal resources may be associated with the virtual portal via a resource association matrix. The method may comprise selecting a virtual portal, in particular by a client/use, determining a score for a resource, wherein the score represents a usefulness factor of the resource.

The method may also comprise determining a set of scored resources, wherein the scored resources are different to the resources associated with the selected virtual portal by the resource association matrix, visually rendering the virtual portal and visually rendering the resources that are associated to the selected virtual portal based on the resource association matrix, and visually rendering the set of scored resources.

Furthermore, the method may comprise selecting, in particular by a user, a scored resource to be associated with the selected virtual portal by updating the resource association matrix with an identifier of the scored resource.

According to another aspect of the present invention, a portal scoring unit for providing software-as-a-service to a plurality of clients may be provided. A portal resource may be selected to be accessible via a virtual portal from a portal server. Portal resources may be selected to be associated to virtual portals via a resource association matrix. The portal scoring unit may comprise a resource palette component which may be adapted for selecting a virtual portal and a resource scoring component which may be adapted for determining a score for a resource, wherein the score represents a usefulness factor of the resource.

The resource palette component may also be adapted for a series of features: (i) for a determination of a set of scored resources, wherein the scored resources may be selected to be different to the resources associated with the selected virtual portal by the resource association matrix; (ii) for visually rendering the virtual portal and visually rendering the resources that may be selected to be associated to the selected virtual portal based on the resource association matrix; and/or (iii) for visually rendering the set of scored resources; and (iv) for selecting a scored resource to be associated with the selected virtual portal by updating the resource association matrix with an identifier of the scored resource.

According to a further aspect of the present invention, a portal server may be provided comprising the portal scoring unit.

It may be noted that the specific software-as-a-service provided here may be a portal-as-a-service, and that a virtual portal may be seen as a virtual web application. It may also be noted that portal resources may be associated with a plurality of virtual portals.

DETAILED DESCRIPTION

Executive Summary Here

Figure 1:
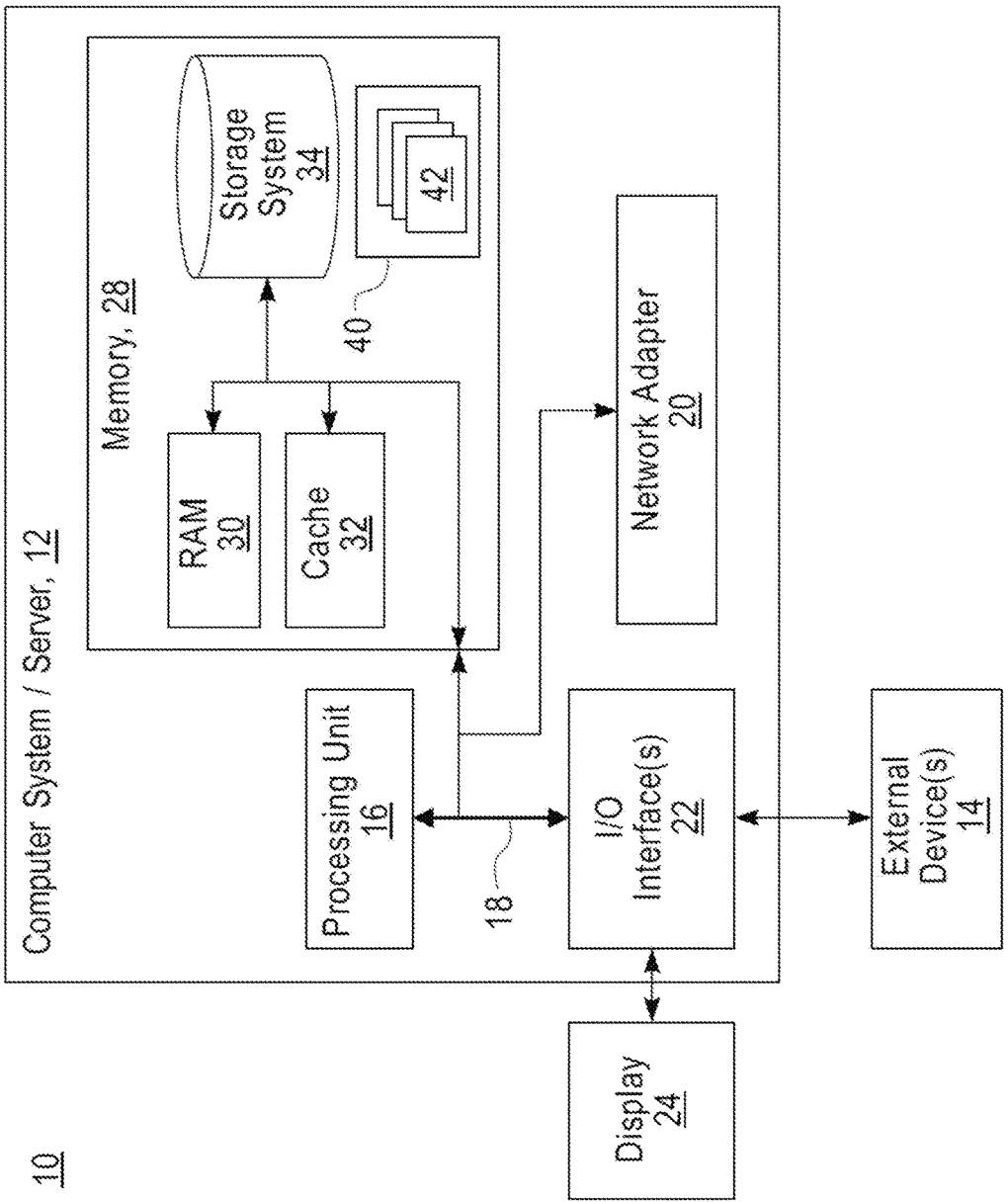
FIG. 1 depicts a cloud computing node used in a first embodiment of a system according to the present invention.

This Detailed Description section is divided into the following sub-sections: (i) The Hardware and Software Environment; (ii) Example Embodiments; (iii) Further Comments and/or Embodiments; and (iv) Definitions.

I. THE HARDWARE AND SOFTWARE ENVIRONMENT

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
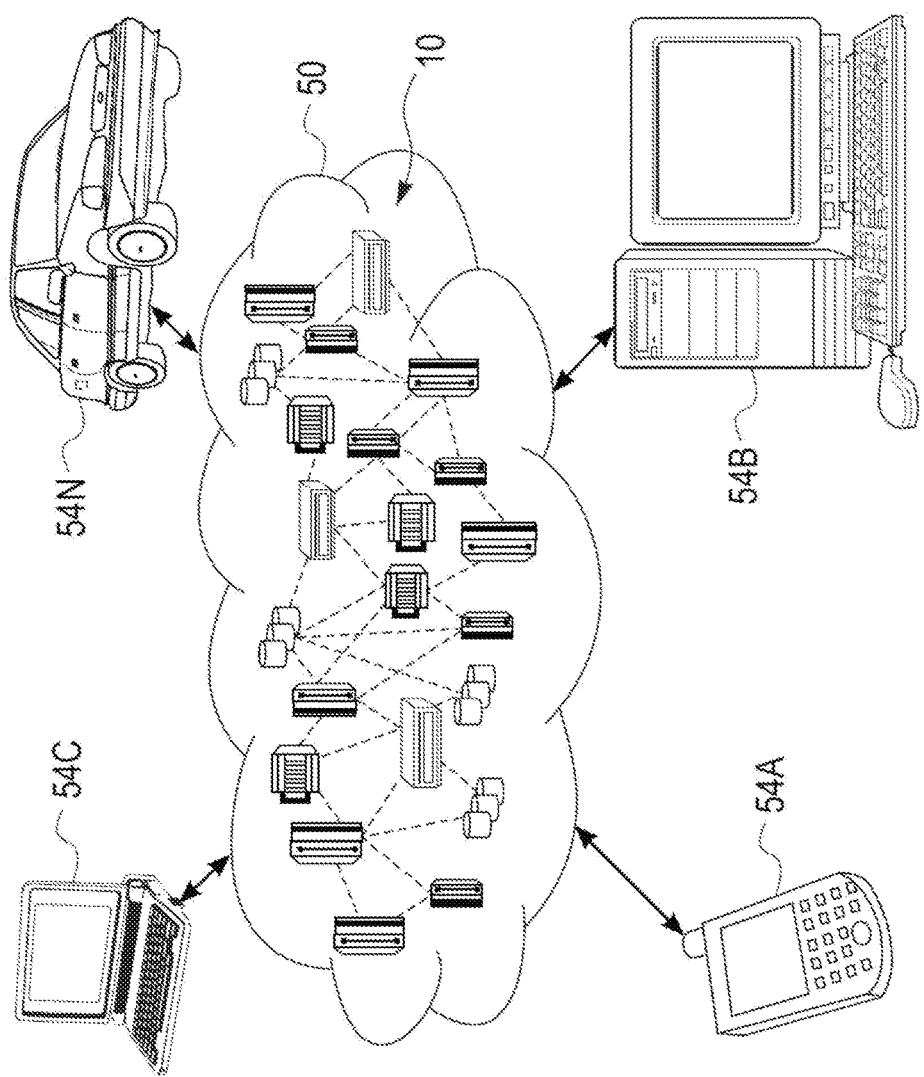
FIG. 2 depicts an embodiment of a cloud computing environment (also called the "first embodiment system") according to the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
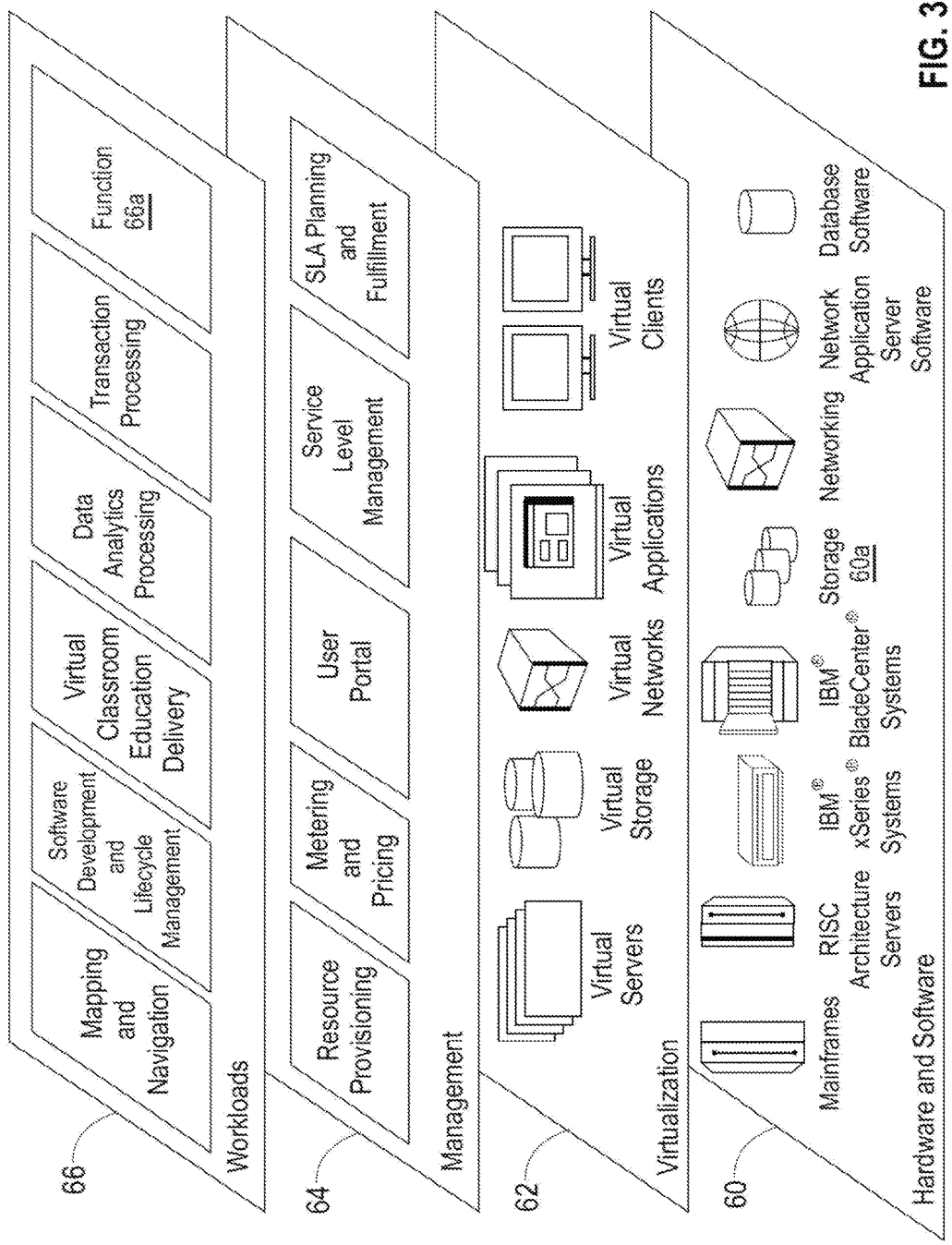
FIG. 3 depicts abstraction model layers used in the first embodiment system.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and functionality according to the present invention (see function block 66a) as will be discussed in detail, below, in the following sub-sections of this Detailed description section.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

II. EXEMPLARY EMBODIMENTS

In the following, a detailed description of the figures will be given. All instructions in the figures are schematic. Firstly, a block diagram of an embodiment of the inventive method for providing software-as-a-service to a plurality of clients is given. Afterwards, further embodiments of the flow charts associated with the method, a portal server, and a related portal scoring unit for providing software-as-a-service to a plurality of clients will be described.

Figure 4:
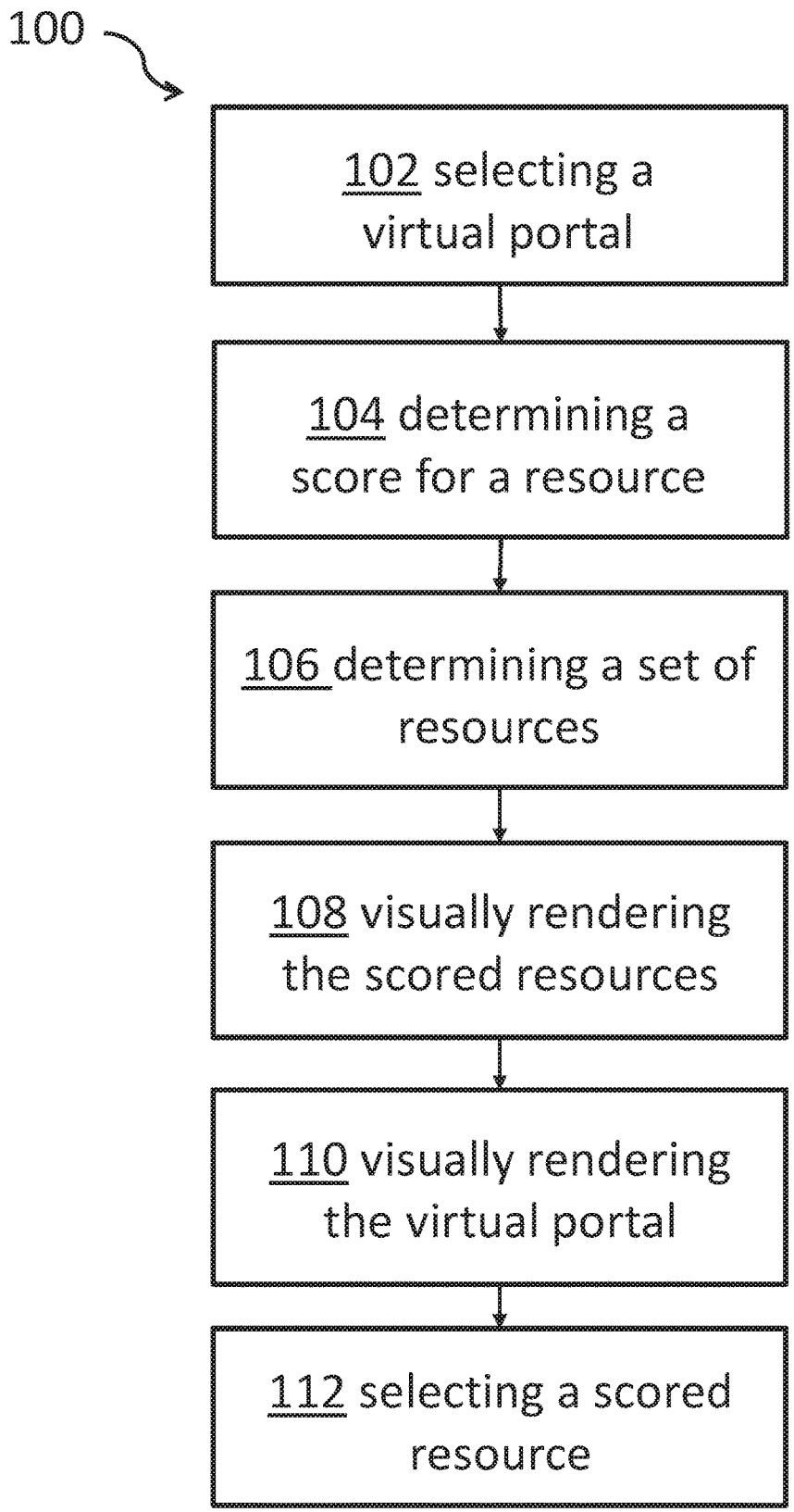
FIG. 4 is a flow chart view of a first embodiment method according to the present invention.

FIG. 4 shows a block diagram of an embodiment of the inventive method 100. A portal resource is accessible via a virtual portal, in particular a virtual web application, from a portal server. Portal resources are associated with the virtual portal, and, in particular, with a plurality of virtual portals, via a resource association matrix. The method comprises selecting, 102, a virtual portal, e.g., by a client/user, and determining, 104, a score for a resource; a process of a scoring function may be executed automatically in the background and/or offline for a plurality of resources, e.g., all resources. The score for a resource may represent a usefulness factor of the resource. The usefulness factor may be a measure of how useful a resource may be for another virtual portal, e.g., for another user.

The method also comprises determining, 106, a set of scored resources. The set may be limited to a predefined maximum number of resources for a set or, the set may comprise all resources of a portal server. The scored resources are different to the resource(s) associated with the selected virtual portal by the resource association matrix. Already used resources of a portal may not be scored again because they are already used and do not need to be proposed as additional resources for the selected virtual portal.

The method also comprises visually rendering, 108, the virtual portal, i.e., display it on a computer screen, and visually rendering the resources that are associated to the selected virtual portal based on the resource association matrix. Additionally, the set of scored resources may be visually rendered, 110, and a scored resource to be associated with the selected virtual portal may be selected, 112. In doing so, the resource association matrix is updated with an identifier of the scored resource.

Figure 5A:
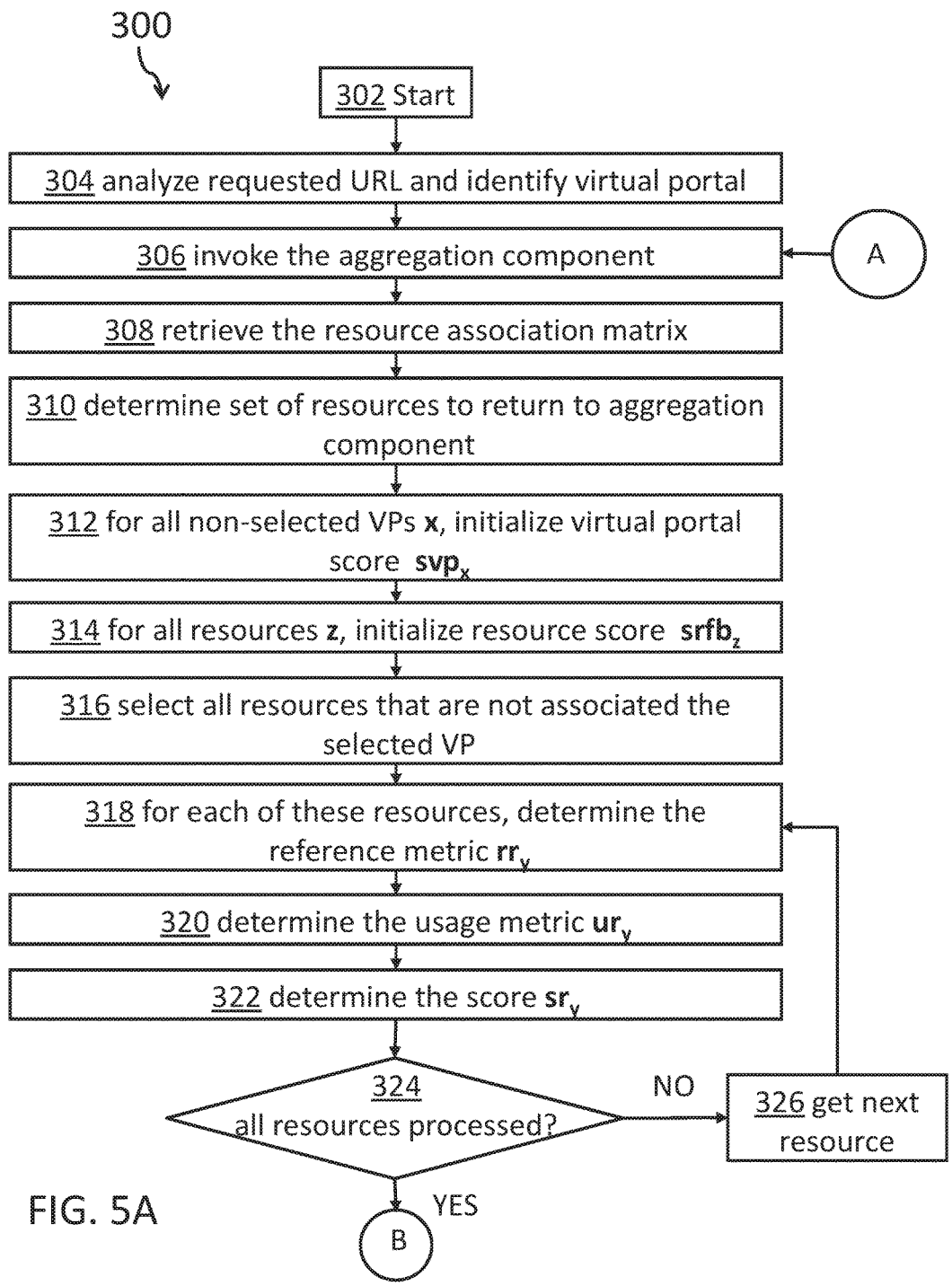
FIGS. 5A and 5B are flow chart views of a second embodiment method performed, at least in part, by the first embodiment system.
Figure 5B:
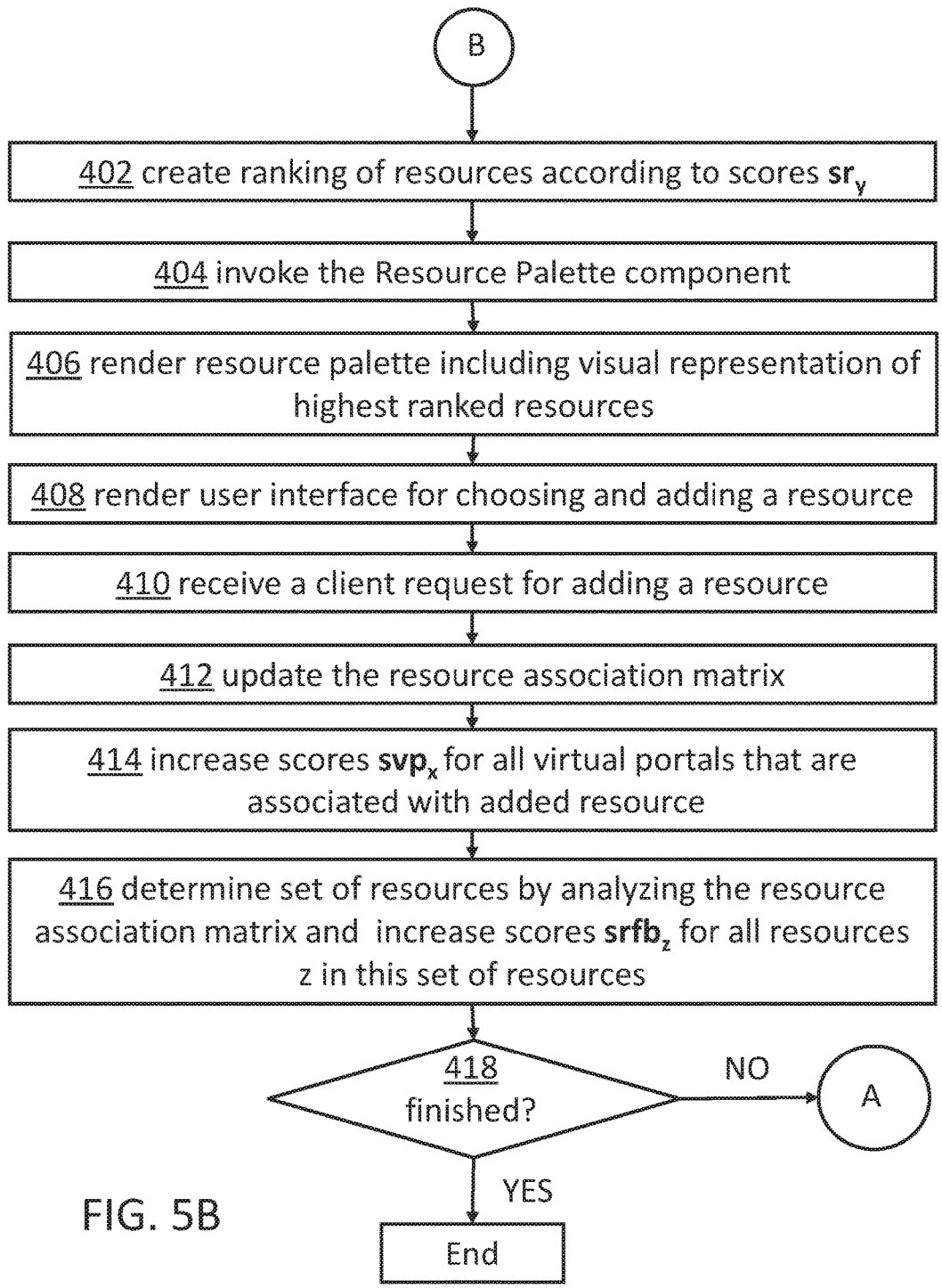
Figure 6:
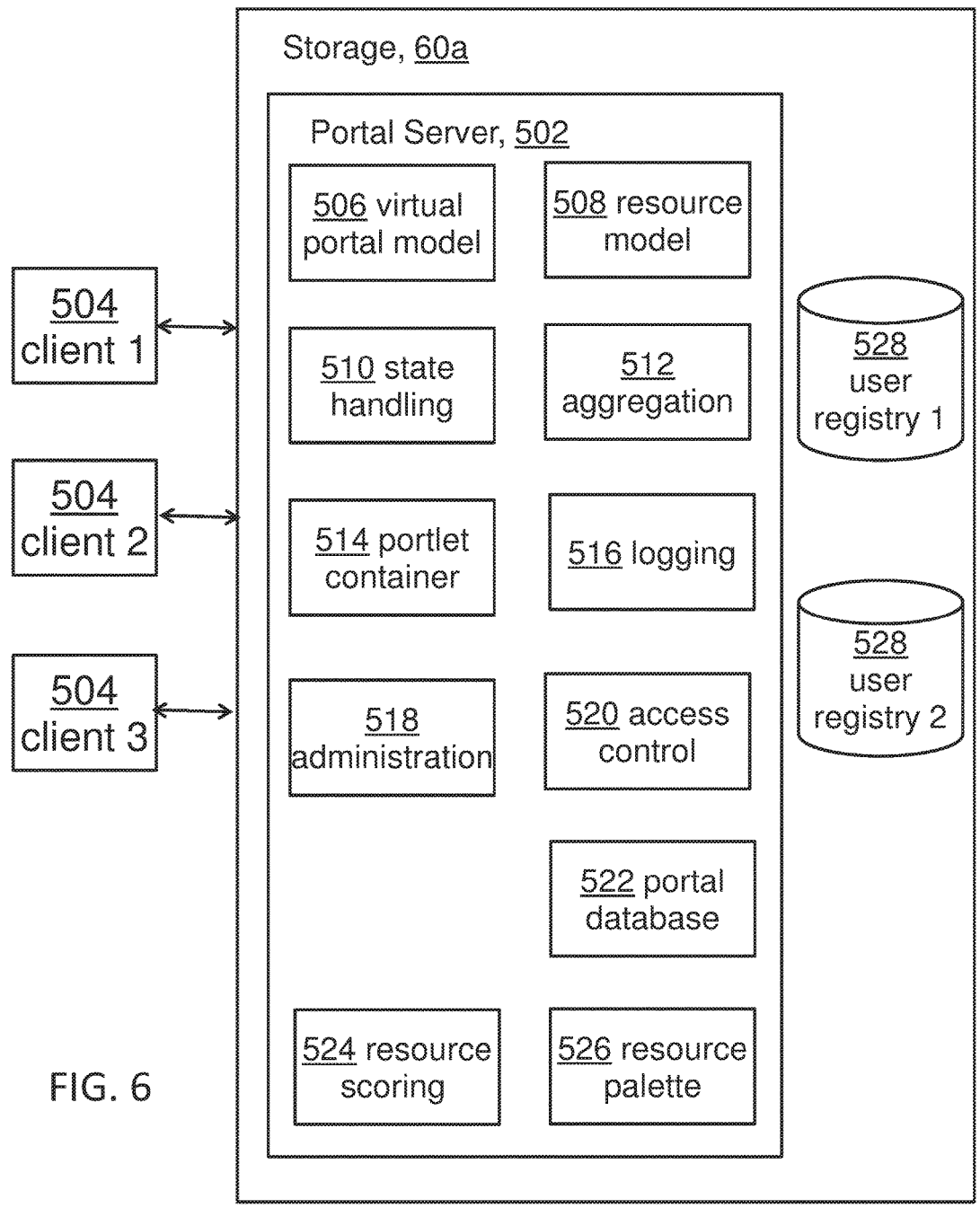
FIG. 6 is a block diagram view of a machine logic (for example, software) portion of the first embodiment system.

FIGS. 5A and 5B show flowchart 300 depicting a method according to the present invention. FIG. 6 shows program 502 and environment portion 500 for performing at least some of the method steps of flowchart 300. This method and associated software will now be discussed, over the course of the following paragraphs, with extensive reference to FIGS. 5A and 5B (for the method step blocks) and FIG. 6 (for the software blocks). As shown in FIG. 6, one physical location where program 500 may be stored is in storage block 60a (see FIG. 3).

FIG. 6 shows a block diagram of an embodiment of a virtual portal server implementation. A portal server 502 may receive requests issued by clients 504, for example, local computing devices having web browsers such as personal digital assistant (PDA) or cellular telephone 54A, desktop computer 54B, laptop computer 54C, and/or automobile computer system 54N (FIG. 2). The portal server 502 returns responses comprising marked-up data, e.g., XML documents to a client 504. The portal server 502 includes: a virtual portal model 506, a resource model 508, a state handling engine 510, an aggregation component 512, one or more portlet container(s) 514, a logging engine 516, an administration component 518, an access control unit 520, and a portal database 522, which may be integrated into the portal 502, or, which may be deployed external to the portal 502. The portal database may have stored information about different users of the portal server 502 or virtual portals deployed by the portal server 502. The user information may be stored as user registries 528.

In addition to that above-mentioned components which may also be found in conventional portal servers, a resource scoring component 524 and a resource palette component 526 are included in the portal server 502. The functionality of the resource scoring component 524 and the resource palette component 526 may, in combination, be viewed as the portal scoring unit.

Referring now to flowchart 300, after a start 302, a requested URL is analyzed and the associated virtual portal is identified, 304. For example, Able, an administrator user, who is entitled to create and configure virtual portals, uses a client, such as a web browser, to connect to Portal XYZ. Able provides a URL in the browser, which contains the identifier of the virtual portal that he wants to configure. The URL, in this example, also contains an identifier of a portal page, or a special identifier to designate that a new page should be created. After the client request is received by Portal XYZ, virtual portal (VP) model module 506 identifies the VP and retrieves the description of the corresponding virtual portal from portal database 522, which may be located in database software of hardware and software layer 60 (FIG. 3), and stores the VP identifier for further use during subsequent request processing.

Aggregation module 512 is invoked, 306. In this example, Portal XYZ, invokes the aggregation module to render the requested page. Page rendering, which is conventional, renders a page and all resources such as portlets, themes, and skins that are directly or indirectly contained in the page. To this end, the aggregation module invokes resource model 508 to query for a set of resources that are contained in a given resource, passing the resource identifier. This way, the aggregation module then invokes the appropriate container for rendering the resource (for example, portlet container 514, if the resource is a portlet). In this example, the aggregation module is a conventional aggregation module, or component. Alternatively, the aggregation module is any aggregation module, or component, now known or to be known in the future.

The resource association matrix is retrieved from persistent storage, such as storage 60a (FIG. 3), 308. A set of resources is determined and delivered back to the aggregation module, 310. In this example, resource model 508, when being invoked by the aggregation module to query for the resources contained in a given resource, returns the resources that are: (i) associated with the selected virtual portal and (ii) reference the given resource identifier. To do this, the resource model retrieves the resource association matrix from persistent storage, as stated above.

In this example, Able, the administrator user, is supported in creating a virtual portal configuration that is both useful and easy to use for the users, and contains the functionality and the resources that are relevant for the users. For this purpose, resource scoring module 524 is invoked to determine a set of recommended resources. The resource scoring module uses implicit feedback from, for example, Able's actions on recommended resources, usage data from logging module 516, and data from resource model 508 to compute a score for each of the resources. The resource scoring module measures how userful a resource is supposed to be for the selected virtual portal. By using implicit feedback, the scoring result is improved with incorporation of the user's actions.

As will be described in detail below, resource scoring is based on the concept of a virtual portal score, svpx, which is calculated for all non-selected virtual portals, and which is later adjusted according to implicit feedback.

For all non-selected virtual portals (VP), x, the virtual portals scores svpx are initialized, for example, with a value of 1 (a non-null value), 312. For each resource, z, a resource feedback score srfbz is initialized, for example, with a value of 1 (a non-null value) 314. The resources that are not associated with the selected VP are selected, 316. In this example, all top-level resources that are not associated with the selected VP are selected. A reference metric, rry, is determined for each selected resource, wherein "y" denotes one resource, 318. The reference metric, rry, represents how often a resource is contained in other resources in each of the non-selected VPs, and may be expressed in the following equation;

$$rry = \frac{\text{number of resources that contain recource } y}{\text{average number where a resource is contained in another resource}},$$

where the numbers are with respect to all non-selected VPs.

A usage metric, ury, for the selected resources is determined, 320. The usage metric, ury, represents how often a resource is used by users of the non-selected virtual portals. For this purpose, logging module 516 is invoked to retrieve usage statistics about the use of resource y in all non-selected VPs. The logging module, or component, returns a usage counter that denotes how often the resource was used in a given timeframe (e.g. 1 month). The logging module also calculates an average usage counter for all resources. The usage metric may be expressed in the following equation:

$$ury = \frac{\text{usage counter of resources, } y}{\text{average usage counter for all resources}},$$

where the counters are with respect to all non-selected VPs.

The score, sry, described in detail above, for the selected resources is determined, 322. The metrics and scores are determined with respect to each selected resources and may vary among resources selected in step 316.

It is determined, 324, whether each of the selected resources have been processed. In case of "no" processing returns, 326, to step 318 (determination of the reference metric rry for each selected resource). In case of "yes" processing proceeds to step 402. Here, a ranking according to the various resource scores sry is determined. The scored resources are ranked according to the score sry, where resources having a higher score are ranked higher than resources having a lower score.

Resource palette module 526 is invoked, 404. The resource palette module passes the ranked resources when invoked. The resource palette module visually offers a subset of the passed resources. In this example, the highest ranked resources are offered in the subset of resources. The resource palette module uses conventional technology to render a complete palette of symbols depicting the resources, 406. In this example, the symbols include a visual representation, in particular, an icon, of the highest ranked, or highest scoring, resources. Alternatively, a list of resource names is depicted.

A user interface is rendered for choosing, adding, and/or selecting additional resources, 408. In this example, the resource palette module renders a user interface that allows Able to select a resource from the set of recommended resources for being added to the virtual portal. When the administrator user selects a resource, the user interface sends a request to the resource palette module. A client request to select one of the proposed resources of the set of selected resources is received, 410, based on the receipt of a select signal. The resource association matrix is updated by resource model 508 accordingly, 412. That is, the resource model creates an association between the selected resource and the selected virtual portal. In addition, the user action represents implicit feedback. Here, implicit feedback is used to weight the factors that are used to calculate the resource scores sry, namely svpx and srfbz. Resource palette module 526 invokes resource scoring module 524 to update the virtual portal scores svpx and the resource scores srfbz.

The score svpx for all VPs that are associated with the added resource are updated, 414. For example, a constant, cvp, may be used as multiplier for the current value of svpx. In this example, the constant, cvp, is definable by a portal administrator to be, for example, cvp=1.25.

A set of resources is determined by analyzing the resource association matrix, 416. Upon selection of a resource, z, resource scoring module 524 selects a first set of resources that contain selected resource, z, based on the resource matrix. For each of the resources in this first set, it calculates a second set of resources, which are directly contained resources. Furthermore, the score, srfbz, for each resource, z, in the second set of resources is increased. For example, a constant, crfb, is used as a multiplier for the current value of srfbz. In this example, the constant, crfb, is definable by a portal administrator to be, for example, crfb=1.25.

It is then determined, 418, if the complete procedure according to the process has been executed. In the case of "no," processing returns to step 306 where aggregation module 512 is invoked, marked "A" in the flowchart. It should be noted that when the process loops at this step, it is often going to continue looping until an administrator user chooses to finish. Upon return, the updated virtual portal is rendered and new scores are computed, which incorporates the implicit feedback from the administrator user. Based on this new scoring, a new set of resources are recommended to the user, who then may continue in configuring the virtual portal. Otherwise, processing ends.

Figures 7, 8A, 8B:
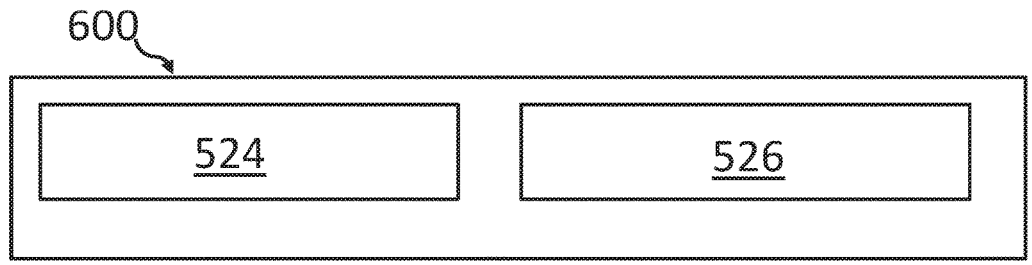
FIG. 7 shows a block diagram of an embodiment of a portal scoring unit according to the present invention.
FIG. 8A is a screenshot showing a first embodiment of a resource association matrix.
FIG. 8B is a screenshot showing a second embodiment of a resource association matrix.

FIG. 7 shows a block diagram of an embodiment of portal scoring unit 600 for providing software-as-a-service to a plurality of clients. A portal resource is selected to be accessible via a virtual portal from a portal server, wherein portal resources are selected to be associated to virtual portals via a resource association matrix. The portal scoring unit 600 comprises a resource palette component 524 adapted for selecting a virtual portal, and a resource scoring component 526 adapted for determining a score for a resource. The score represents a usefulness factor of the resource. The resource palette component is adapted for a determination of a set of scored resources, wherein the scored resources are different to the resources associated with the selected virtual portal by the resource association matrix.

The resource palette component 526 is adapted for visually rendering the virtual portal and visually rendering the resources that are associated to the selected virtual portal based on the resource association matrix, and the resource palette component is also adapted for visually rendering the set of scored resources. Additionally, the resource palette component is also adapted for selecting a scored resource to be associated with the selected virtual portal by updating the resource association matrix with an identifier of the scored resource.

III. FURTHER COMMENTS AND/OR EMBODIMENTS

In the context of this Detailed Description section, the following conventions, terms and/or expressions may be used:

The term "software-as-a-service" may denote a provisioning of software, e.g., a portal and web application, for a plurality of users in a Cloud environment.

The term "multi-tenancy" refers to a scenario where a tenant is a subscriber to the service and utilizes a service. Typically, a tenant is an enterprise or an organization. It is important to note that the difference between a tenant and a user is that the user of the service is typically a member of the tenant's organization. Multi-tenancy refers to the architectural principle where multiple tenants are integrated on the same system. Software-as-a-service providers typically use a multi-tenant architecture where multiple different tenants each execute the same software that processes their specific tenant-owned data.

The term "portal resource" may denote all data entities that are used by a portal when processing client requests. Typical portal resources may be pages, themes and skins, content items, portlet instances and portlet preferences. The portal may comprise data describing these resources and the associations between the resources, as well as the artifacts that are used for invoking and rendering the resources like Java Server Pages (JSPs), Web application descriptors, images such as Graphics Interchange Format files (GIFs), deployment descriptors, configuration files, Java ARchive (JAR) files that comprise logic and formatting instructions for the resource, and any other data necessary for processing a resource.

It should be noted that some resources may be associated with other resources. For example, as shown in FIGS. 8A and 8B, a portal page may comprise one or multiple portlet instances or even other portal pages. FIG. 8A shows a block diagram of embodiments of the resource association matrix. Column 204 shows the resources page 1, page 2, page 3, portlet 1, and portlet 2. Row 202 shows three virtual portals (VPs): VP1, VP2, and VP3. Example values for the resources of column 204 with respect to the portals in resource association matrix 200a include: (i) null value, 0, where the resource is not associated with the virtual portal; and (ii) non-null value, 1, where the resource is associated with the virtual portal (it is not contained in another resource in the context of this virtual portal. The associations between resources may form a resource hierarchy.

Resource matrices 200a and 200b depict the resource hierarchy for each virtual portal. In consequence, two virtual portals may have differently structured resource hierarchies. For example, in FIG. 8B, portlet2 of virtual portal 2 (VP2) is contained in page 2, while the same portlet 2 is contained in page 3 of virtual portal 3 (VP3). Example values for resources in resource association matrix 200b include: (i) null value where the resource is not associated with the virtual portal; (ii) non-null value where the resource is associated with the virtual portal (it is not contained in another resource in the context of this virtual portal); and (iii) a non-null resource identifier, or set of resource identifiers, where the resource is associated with the virtual portal (it is contained in the resource, of the set of resources, designated by the resource identifier(s)).

As stated above, in a portal there may be hierarchical relations between portal resources. These hierarchical relations may be represented, e.g., in a tree like data structure or in a relational data structure.

The term "virtual portal" may denote one portal out of a plurality of portals deployed on one portal server. It may also be viewed as entities, each entity representing the logical behavior of a distinct portal but implemented by one portal server. The portal server may represent the server or backend component interacting with the user interface of the portal in a Web browser. Also, other systems may access the portal, e.g., thin-client applications or traditional fat applications.

The term "usefulness factor" may denote a scoring factor indicating how useful a resource is for the users of the virtual web application. The resource does not need to be an element of a specific virtual portal. It may be any resource accessible by the portal server of the plurality of virtual portals.

The term "resource identifier" may denote a string of alphanumeric characters, or any other bit combination, suitable to uniquely identify a given resource.

The term "virtual portal identifier" may denote a string of alphanumeric characters, or any other bit combination, suitable to uniquely identify a given virtual portal.

The term "resource association matrix" may denote a two-dimensional matrix to represent the associations between resources and virtual web applications, i.e., virtual portals. The resource association matrix may be a two-dimensional data structure where one dimension may represent resources and the other dimension may represent virtual portals. The values in the matrix are either 0 (null), meaning that the resource is not associated with the virtual portal, or, non-null, meaning that the resource is associated with a virtual portal. The resource association matrix is instrumental in overcoming restrictions of conventional resource/virtual portal association models. Resources may now be associated with n, (n≥0) virtual portals, and, at the same time, a virtual portal may be associated with m (m≥0) resources. Examples of a resource association matrix are depicted in FIGS. 8A and 8B, above.

The term "resource palette component" may denote a component of the portal server adapted to perform a plurality of tasks, like, e.g., invoking rendering functions to enable, in a user interface, an interaction with an administrative component of a portal. It may invoke a resource model for updates of the resource association matrix, and it may involve resource scoring components. Basically, it may build a central coordination component for the inventive method. The resource palette component may be built in software, in hardware or, in a combination of both.

The term "resource scoring component" may denote a determination function for determining the score for a resource. The resource scoring component may involve a series of computations of different variables. It may be executed as a background function, i.e., as a background process under control of the portal server. The resource scoring component may be built in software, in hardware or, in a combination of both.

Some embodiments of the present invention are directed to a method for providing software-as-a-service to a plurality of clients that offers advantages including: (i) a ratio of 1:n, where n≥0, for relationships between a resource and virtual web applications are provided for virtual portals (that is, for one resource, there may be associated with it none, one, or multiple virtual web applications to allow for sharing resources between different virtual web applications such that additional memory consumption for storing the same resource for different virtual portals may be eliminated); (ii) a resource association matrix is used as data structure for representing the associations between resources and virtual web applications. Such a data structure may be easily maintained; and/or (iii) resources are automatically recommended for being included in a virtual web application.

Accordingly, the proposed method for creating resources in a virtual web application may automatically recommend resources for being included in a virtual web application, such as a virtual portal. Such recommendation may be based on an automatically determined usefulness of resources. This may reduce the administrative overhead for managing a plurality of virtual portals and, at the same time, increase the user-friendliness of the respective virtual portals.

According to one embodiment of the method, the determining the score for a resource may be performed as a background function. That may be a background process not involving any user activity. Thus, the scoring process may be performed in a sort of self-optimization of a virtual portal environment.

The portal resources may be selected to be one out of the group consisting of a web page, a portal theme, a portal skin, a content item, a portlet instance, a portlet preference, a bookmark list, a web application, an image, a sound file and a video file. Thus, the full spectrum of resources available for a usage in portal or portlets may be addressed. However, the portal resources are not limited to the types of resources mentioned above. Resources may also comprise other resources and thus, build a hierarchy of recourses.

According to again another embodiment of the method, the resource association matrix may be a two-dimensional matrix comprising resource identifiers, in particular as rows of the matrix, and virtual portal identifiers, in particular as columns of the matrix. This may be an elegant and intuitive way for managing dependencies of a plurality of resources to a plurality of virtual portals.

In one embodiment of the method, a reference metric value may be determined based on how often a resource may be included in another resource which is associated with a virtual portal other than the selected virtual portal. This may be represented by the variable rry, wherein y may identify a resource. It may indicate how popular a resource in a plurality of virtual portals may be.

According to an additional embodiment of the method, a usage metric value may be determined based on how often a resource may be accessed through a virtual portal other than the selected virtual portal. This may be represented by the variable ury, wherein y may identify a resource. Because resources may be organized in a hierarchical structure, this may apply for top-level resources.

According to an additional embodiment of the method, portal score values for virtual portals other than the selected virtual portal may be increased if the selected resource may be enclosed in the virtual portals other than the selected virtual portal. The portal score value for a virtual portal may be represented by a variable svpx, wherein x may identify a virtual portal. This variable may have an initial value of 1. Each time it may be increased, a constant cvp may be used as multiplier for the value of svpx. The constant cvp may be definable by a portal administrator, e.g., cvp=1.25.

According to an advanced embodiment of the method, a feedback score value for a resource y that may be included in a resource, in particular a plurality of resources, that comprises the selected scored resource to be associated with the selected virtual portal may be increased. The feedback score value may be represented by a variable srfbz, wherein y may identify the resource. This variable may have an initial value of 1. Each time it may be increased, a constant crfb may be used as multiplier for the value of srfbz. The constant crfb may be definable by a portal administrator, e.g., crfb=1.25. It may be noted that the resources, selected in such a way, are brother and sister resources to the resource.

According to an advantageous embodiment of the method, the score for a resource y, in particular the resource in question, may be determined based on a function F:

$$sry=F(svpx, srfbz, ury, rry),$$

wherein sry=the score of the selected resource y, svpx=the portal score value of the portal x, srfbz=the feedback score value for the resource y, ury=the usage metric value of the resource y, and rry=the reference metric value for the resource y.

It should be noted that the value svpx may be a compound value for a plurality of virtual portals x. Thus, svpx=G (svpi), i≠x; meaning all virtual portals without the selected one. G may, for example, be an averaging function for all discrete svpi values. An equivalent situation may be there for srfbz.

In its simplest form, the score for the resource "y" may be determined by the multiplication operation that follows:

$$sry=svpx*srfbz*ury*rry.$$

This may represent a powerful method for determining a usefulness factor for a resource in a dynamic and adaptive way. Changes in selected resources may be reflected immediately in score values for other resources. Thus, the user interface for an administrator of a virtual portal may display a changed list of resources once a new resource may have been selected.

Possible combinations of features described above follow:

A method (100) for providing software-as-a-service to a plurality of clients (504), wherein a portal resource is accessible via a virtual portal from a portal server (502), wherein portal resources are associated with the virtual portal via a resource association matrix (204), the method including: (i) selecting (102) a virtual portal; (ii) determining (104) a score for a resource, wherein the score is selected to represent a usefulness factor of the resource; (iii) determining (106) a set of scored resources, wherein the scored resources are selected to be different to the resources associated with the selected virtual portal by the resource association matrix (204); (iv) visually rendering (108) the virtual portal and visually rendering the resources that are selected to be associated to the selected virtual portal based on the resource association matrix; (v) visually rendering (110) the set of scored resources; (vi) selecting (112) a scored resource to be associated with the selected virtual portal by updating the resource association matrix (204) with an identifier of the scored resource.

The method (100) above, wherein the determining the score for a resource is performed as a background function.

The method (100) above, wherein the portal resources are selected to be one out of the group consisting of a web page, a portal theme, a portal skin, a content item, a portlet instance, a portlet preference, a bookmark list, a web application, an image, a sound file and a video file.

The method (100) above, wherein the resource association matrix (204) is a 2-dimensional matrix comprising resource identifiers and virtual portal identifiers.

The method (100) above, wherein a reference metric value is determined based on how often a resource is included in another resource which is associated with a virtual portal other than the selected virtual portal.

The method (100) above, wherein a usage metric value is determined based on how often a resource is accessed through a virtual portal other than the selected virtual portal.

The method (100) above, wherein portal score values for virtual portals other than the selected virtual portal are increased.

The method (100) above, wherein a feedback score value for a resource that is included in resources that comprise the selected scored resource to be associated with the selected virtual portal is increased.

The method (100) above, wherein the score for a resource "y" is determined based on a function F:

$$sry = F(svpx, srfbz, ury, rry),$$

wherein, sry=the score of the selected resource y, svpx=the portal score value for portal x, srfbz=the feedback score value for portal y, ury=the usage metric value for resource y, and rry=the reference metric value for resource y.

A portal scoring unit (600) for providing software-as-a-service to a plurality of clients (504), wherein a portal resource is selected to be accessible via a virtual portal from a portal server (502), and wherein portal resources are selected to be associated to virtual portals via a resource association matrix (204), the portal scoring unit (600) including: (i) a resource palette component (524) adapted for selecting a virtual portal, (ii) a resource scoring component (526) adapted for determining a score for a resource, wherein the score represents a usefulness factor of the resource, wherein the resource palette component (524) is adapted for a determination of a set of scored resources, wherein the scored resources are different to the resources associated with the selected virtual portal by the resource association matrix (204), wherein the resource palette component (524) is adapted for visually rendering the virtual portal and visually rendering the resources that are associated to the selected virtual portal based on the resource association matrix (204), wherein the resource palette component (524) is adapted for visually rendering the set of scored resources, and wherein the resource palette component (524) is adapted for selecting a scored resource to be associated with the selected virtual portal by updating the resource association matrix (204) with an identifier of the scored resource.

A portal server (500) comprising the portal scoring unit (600), above.

A data processing program comprising software code portions for performing the method (100) for providing software-as-a-service to a plurality of clients (504), above, when the data processing program is run on a computer (700).

A computer program product comprising computer readable program means for causing a computer (700) to perform the method (100) for providing software-as-a-service to a plurality of clients (504), above, when the program means is run on the computer (700).

IV. DEFINITIONS

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Electrically Connected: means either directly electrically connected, or indirectly electrically connected, such that intervening elements are present; in an indirect electrical connection, the intervening elements may include inductors and/or transformers.

Mechanically connected: Includes both direct mechanical connections, and indirect mechanical connections made through intermediate components; includes rigid mechanical connections as well as mechanical connection that allows for relative motion between the mechanically connected components; includes, but is not limited, to welded connections, solder connections, connections by fasteners (for example, nails, bolts, screws, nuts, hook-and-loop fasteners, knots, rivets, quick-release connections, latches and/or magnetic connections), force fit connections, friction fit connections, connections secured by engagement caused by gravitational forces, pivoting or rotatable connections, and/or slidable mechanical connections.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method for providing software-as-a-service to a plurality of clients, the method comprising
   selecting a first virtual portal;
   determining a score for a first resource to generate a first scored resource;
   determining a set of scored resources;
   visually rendering the first virtual portal and a set of portal resources;
   visually rendering the set of scored resources;
   selecting the first scored resource from the set of scored resources to be associated with the first virtual portal by updating a resource association matrix with an identifier of the scored resource;
   wherein:
   the first resource is accessible via the first virtual portal from a portal server;
   the set of portal resources are associated with the first virtual portal by the resource association matrix;
   the score is selected to represent a usefulness factor of the first resource;
   each scored resource of the set of scored resources is selected to be different than each portal resource of the set of portal resources associated with the first virtual portal by the resource association matrix; and
   the score for the first resource is determined based on a function F, where: sry=F (svpx, srfbz, ury, rry), and wherein:
   sry=the score of the first resource,
   svpx=the portal score value for the first portal,
   srfbz=the feedback score value for the first resource,
   ury=the usage metric value for the first resource, and
   rry=the reference metric value for the first resource.

2. The method of claim 1, wherein the determining the score for the first resource is performed as a background function.

3. The method of claim 1, wherein the first resource is selected from one of a web page, a portal theme, a portal skin, a content item, a portlet instance, a portlet preference, a bookmark list, a web application, an image, a sound file, and a video file.

4. The method of claim 1, wherein the resource association matrix is a two-dimensional matrix including a resource identifier and a virtual portal identifier.

5. The method of claim 1, further comprising:
   determining a reference metric value for the first resource based on how often the first resource is included in a second portal resource associated with a second virtual portal.

6. The method of claim 1, further comprising:
   determining a usage metric value for the first resource based on how often the first resource is accessed through a second virtual portal.

7. The method of claim 1, wherein a portal score value for a second virtual portal is increased.

8. The method of claim 1, wherein a feedback score value for the scored resource in the set of scored resources associated with the first virtual portal is increased.

* * * * *